US009798181B2

(12) United States Patent
Wang et al.

(10) Patent No.: US 9,798,181 B2
(45) Date of Patent: Oct. 24, 2017

(54) DISPLAY APPARATUS AND METHOD FOR PRODUCING A MARKER IN THE DISPLAY APPARATUS

(71) Applicants: BOE Technology Group Co., Ltd., Beijing (CN); Hefei BOE Optoelectronics Technology Co., Ltd., Anhui (CN)

(72) Inventors: Hui Wang, Beijing (CN); Yuanhui Guo, Beijing (CN); Chun Wang, Beijing (CN); Junsheng Chen, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 258 days.

(21) Appl. No.: 14/424,508

(22) PCT Filed: Jun. 25, 2014

(86) PCT No.: PCT/CN2014/080727
§ 371 (c)(1),
(2) Date: Feb. 27, 2015

(87) PCT Pub. No.: WO2015/096431
PCT Pub. Date: Jul. 2, 2015

(65) Prior Publication Data
US 2016/0011456 A1 Jan. 14, 2016

(30) Foreign Application Priority Data
Dec. 26, 2013 (CN) .......................... 2013 1 0731238

(51) Int. Cl.
*G02F 1/1333* (2006.01)
*G02F 1/1335* (2006.01)
(Continued)

(52) U.S. Cl.
CPC ....... *G02F 1/133514* (2013.01); *G02B 5/201* (2013.01); *G02F 1/133351* (2013.01);
(Continued)

(58) Field of Classification Search
CPC ... G02F 1/133351; G02F 2001/133374; G02F 1/133514; G02F 1/133512; G02F 1/1339; G02B 5/201
See application file for complete search history.

(56) References Cited

U.S. PATENT DOCUMENTS

2002/0085163 A1* 7/2002 Park ...................... G02F 1/1333
349/158
2003/0117549 A1 6/2003 Yi et al.
(Continued)

FOREIGN PATENT DOCUMENTS

CN 103698932 A 4/2014
CN 103777407 A 5/2014
(Continued)

OTHER PUBLICATIONS

First Office Action for Korean Patent Application No. 10-2015-7014052, dated Apr. 28, 2016, 7 pages.
(Continued)

*Primary Examiner* — Jessica M Merlin
(74) *Attorney, Agent, or Firm* — Westman, Champlin & Koehler, P.A.

(57) ABSTRACT

The present disclosure provides a display apparatus, comprising an array substrate and a color filter substrate, wherein a black matrix and an alignment film are coated sequentially on a part of an inner surface of the color filter substrate, and
(Continued)

wherein another alignment film is coated on a part of an inner surface of the array substrate, and wherein the inner surface of the array substrate has an edge which is adhered by a sealant to an edge of the inner surface of the color filter substrate, and wherein a first marker region for marking unitary display screens in the same batch of exposure is arranged on the inner surface of the array substrate at a source end at the bottom of the display apparatus, and wherein a second marker region for marking unitary display screens in different batches of exposure is arranged inside the bottom of the sealant perpendicular to the array substrate and the color filter substrate and between the array substrate and the color filter substrate. The present disclosure also provides a method for producing a display apparatus. The present invention solves a problem that Panel ID marking process limits the capacity of production and the Panel ID occupies large space in the peripheral regions of the display screens. It improves the capacity of production in the production line efficiently while optimizing the design spaces of the peripheral regions of the display screens.

4 Claims, 5 Drawing Sheets

(51) Int. Cl.
*G02F 1/1339* (2006.01)
*G02B 5/20* (2006.01)

(52) U.S. Cl.
CPC ...... *G02F 1/133512* (2013.01); *G02F 1/1339* (2013.01); *G02F 2001/133374* (2013.01)

(56) References Cited

U.S. PATENT DOCUMENTS

2005/0225702 A1   10/2005   Yi et al.
2008/0136993 A1    6/2008   Jeong et al.
2010/0014043 A1*   1/2010   Ootaguro .............. G02F 1/1339
                                                349/154

FOREIGN PATENT DOCUMENTS

| JP | 2007-108590 A | 4/2007 |
| KR | 10-2002-0087206 A | 11/2002 |
| KR | 10-2004-0035119 A | 4/2004 |
| KR | 10-2008-0002567 A | 1/2008 |

OTHER PUBLICATIONS

International Search Report and Written Opinion (in Chinese) for PCT Application No. PCT/CN2014/080727, dated Sep. 30, 2014, 11 pages.
Extended European Search Report, pursuant to Rule 62 EPC, and European Search Opinion (ESOP) for European Patent Application No. 14838762.4, Mar. 21, 2016, 13 pages.
English translation of Box No. V from the Written Opinion for the International Searching Authority for PCT Application No. PCT/CN2014/080727 which was dated Sep. 30, 2014, 2 pages.

* cited by examiner

DISPLAY APPARATUS AND METHOD FOR PRODUCING A MARKER IN THE DISPLAY APPARATUS

CROSS-REFERENCE TO RELATED APPLICATION

This application is a Section 371 National Stage application of International Application No. PCT/CN2014/080727, filed Jun. 25, 2014 which has not yet published, which claims priority to Chinese Application No. 201310731238.7, filed Dec. 26, 2013, in Chinese, the contents of which are hereby incorporated by reference in their entirety.

BACKGROUND OF THE INVENTION

Field of the Invention

The present disclosure relates to technical field of display, more particularly, relates to a thin film transistor liquid crystal display apparatus (abbreviated as TFT-LCD below) and a method for producing the same.

Description of the Related Art

In the technical field of display, a liquid crystal display panel is widely applied in modem digital information apparatuses, due to advantages thereof, such as small volume, low power consumption, no radiation and high resolution.

For manufacturers of panels, the more the unitary display screens split by one mother (template) glass, the greater profit can be obtained by the production line. In order to recognize each unitary display screen, in producing process, Panel ID will be made on each unitary display screen. As all of the unitary display screens have different Panel IDs from each other, each of them needs to be marked sequentially by a laser pointer in production lines. When one mother glass has a small number of unitary display screens, the marking operation of the Panel ID is easy and it only needs low production capacity of the production line. In contrast, when one mother glass has a large number of unitary display screens, the marking operation of the Panel ID will become relatively cumbersome and it needs high production capacity of the production line. In particular, as the sizes of unitary display screens made by respective generations of panel production lines become smaller and smaller at present, one mother glass substrate has comprised hundreds of unitary display screens, and thus the marking operation of the Panel ID becomes difficult. Sometimes, considering the production capacity of production lines, the Panel ID of the unitary display screens would not be marked. In this way, the issues in the following producing process may not be traced to the preceding producing process such that the efficiency of production lines will be reduced significantly. On the other hand, the peripheral regions of small-sized display screens become smaller and smaller at present, but the Panel ID will occupy a certain space by itself. Thus, it is very crucial to propose a method for marking the Panel ID on small-size display screen.

SUMMARY OF THE INVENTION

In order to solve the above problems in the prior art, the present disclosure provides over the prior art: on one hand, distinguishing the unitary display screens in the same batch of exposure by designing masks of array substrates in the liquid screens specifically; on the other hand, providing of specifically-shaped regions coated with a marker sealant on peripheral regions of the unitary display screens to distinguish the unitary display screens in different batches of exposure from each other depending on lengths of coating the marker sealant in the regions, thereby achieving the marking of Panel ID in the unitary display screens.

An embodiment of the present invention provides a display apparatus, comprising an array substrate and a color filter substrate, wherein a black matrix and an alignment film are arranged sequentially on an inner surface of the color filter substrate, and wherein another alignment film is arranged on an inner surface of the array substrate, and wherein an edge of the inner surface of the array substrate and an edge of the inner surface of the color filter substrate are adhered to each other by a sealant, and wherein a first marker region for marking unitary display screens in the same batch of exposure is arranged on the inner surface of the array substrate at a source end located at the bottom of the display apparatus, and wherein a second marker region for marking unitary display screens in different batches of exposure is arranged between the inside of the sealant and a display region of the corresponding unitary display screen.

An embodiment of the present invention also provides a method for producing a marker in a display apparatus, comprising the steps of:

providing a first marker region on an inner surface of the array substrate at a source end located at the bottom of the display apparatus, the first marker region being configured to mark unitary display screens in the same batch of exposure;

providing a second marker region between the inside of sealant of the corresponding unitary display screen and a display region of the corresponding unitary display screen, the second marker region being configured to mark unitary display screens in different batches of exposure;

adhering an edge of an inner surface of the array substrate to an edge of an inner surface of the color filter substrate by the sealant.

The present invention not only solves the limitation of Panel ID marking process to the capacity of production in production line, but also prevents the Panel ID from occupying large spaces in the peripheral regions of the display screens. By means of simple process design and alternation, the present invention improves the capacity of production in production line efficiently while optimizing the design spaces of the peripheral regions of the display screens.

DETAILED DESCRIPTION OF EMBODIMENTS OF THE INVENTION

The objects, technical solutions and advantages of the present invention will become more apparent by further explaining the present invention with reference to the embodiments and drawings below.

Figure 1:
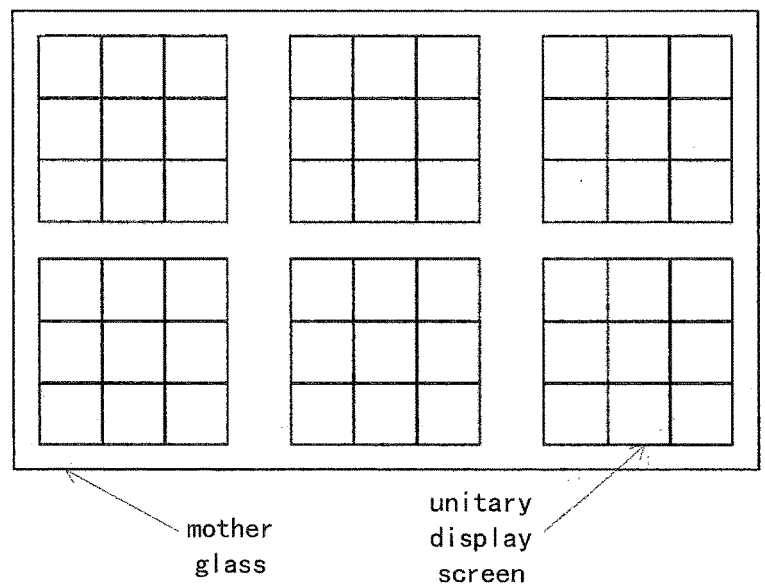
FIG. 1 is a schematic view showing an arrangement of the unitary display screens on a mother glass.

FIG. 1 is a schematic view showing an arrangement of the unitary display screens on a mother glass. As illustrated in FIG. 1, one mother glass is arranged with a plurality of unitary display screens thereon, for example fifty-four unitary display screens shown in FIG. 1. In the process of producing an array substrate, to meet requirements of exposure processes of the respective layers of films, one mother glass typically needs to be exposed by several times. At present, a typical process is the six-time exposure process shown in FIG. 1. However, in consideration of the costs and capacity of production, the times of exposure process will be reduced gradually.

Figure 2:
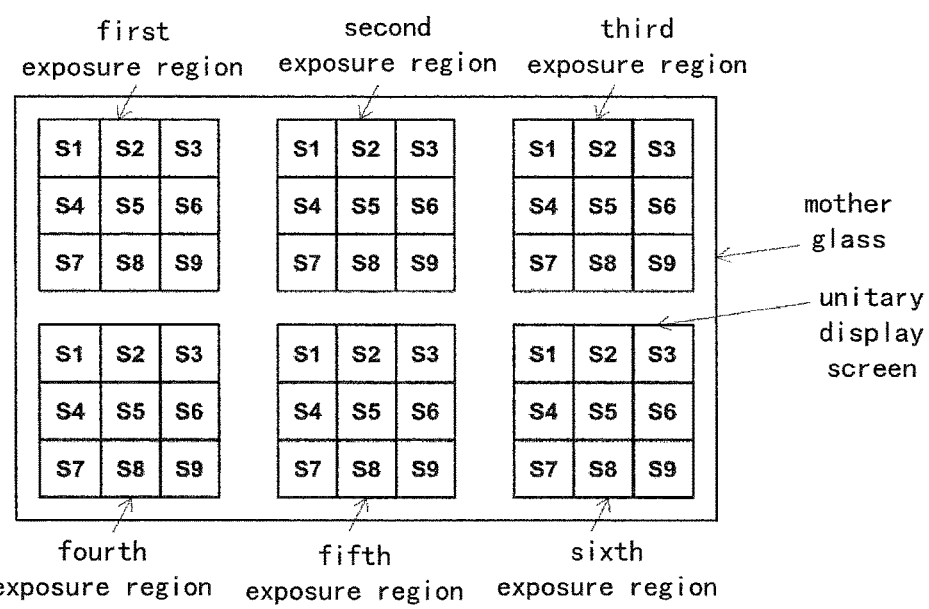
FIG. 2 is a schematic view showing Panel ID formed by the exposure process.

As the exposure process is a repetitive producing process, the Panel ID of the unitary display screens in different batches of exposure cannot be distinguished from each other by the exposure process. In the exposure process, as shown in FIG. 2, by designing special Panel ID, for example, S1, S2, S3 . . . S9, for the mask on a certain layer on the glass array substrate, the unitary display screens in the same batch of exposure are distinguished from each other, but the unitary display screens in different batches of exposure cannot be identified.

Narrow frame type display is a development trend of future display screen. Thus, the marker of the unitary display screen Panel ID not only needs to consider the capacity of production in producing process, but also needs to consider the size of space occupied by the Panel ID on the peripheral regions of the unitary display screens. In TV (television) or NB (notebook computer) production, generally, one Panel ID occupies a space size of 1 cm*10 cm, however, for a cell phone product, as the space on the peripheral regions of its display screen has a relatively small size, there are a great deal of lines on the array substrate. Thus, it will not remain such large space of 1 cm*10 cm as TV and NB.

Figure 3:
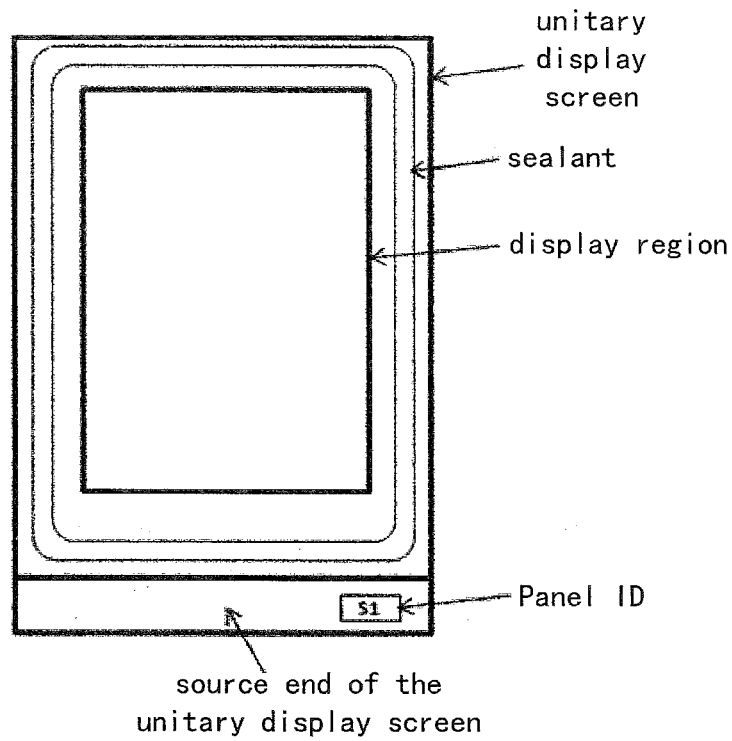
FIG. 3 is a plan schematic view showing a structure of a unitary display screen in the prior art.

FIG. 3 is a plan schematic view showing a structure of a unitary display screen in the prior art. As shown in FIG. 3, the Panel ID is typically arranged at an end or at a corner of the display screen.

In view of the above, in the present disclosure, the efficient marking of Panel ID of all of the unitary display screens on one mother glass may be achieved mainly by the exposure process in combination with the sealant coating process for adhering the array substrate with the color filter substrate when they are assembled.

Figure 4:
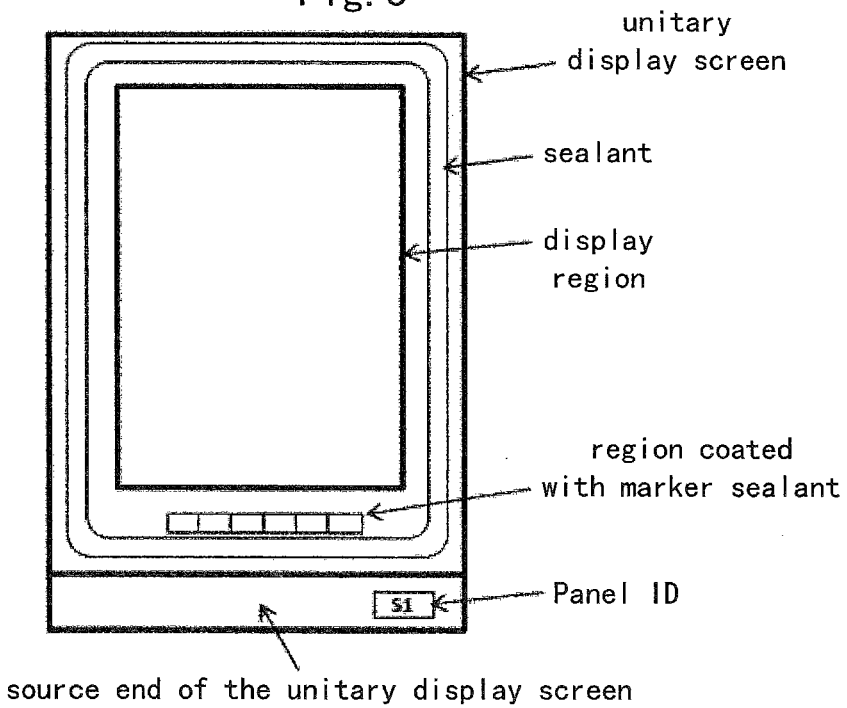
FIG. 4 is a plan schematic view showing a structure of a unitary display screen according to an embodiment of the present invention.
Figure 5:
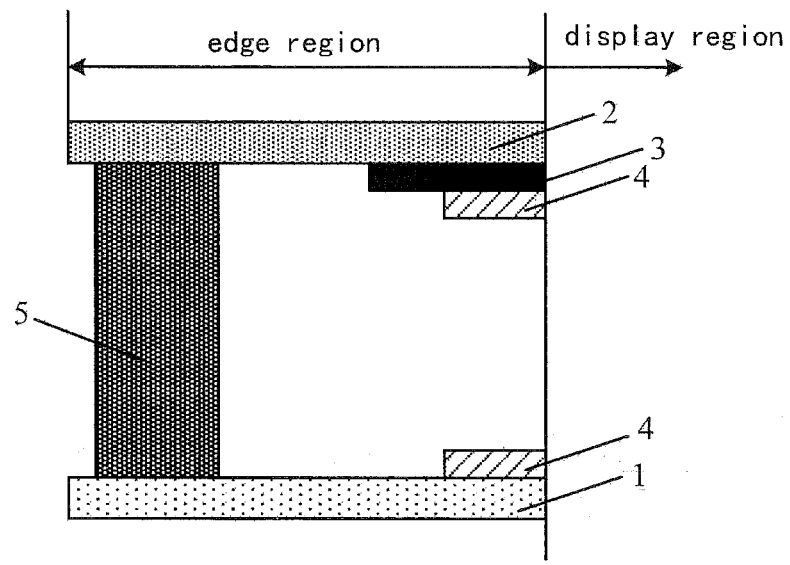
FIG. 5 is a cross sectional schematic view showing peripheral regions of the unitary display screen, as shown in FIG. 3, in which a region coated with a marker sealant is not provided.
Figure 6:
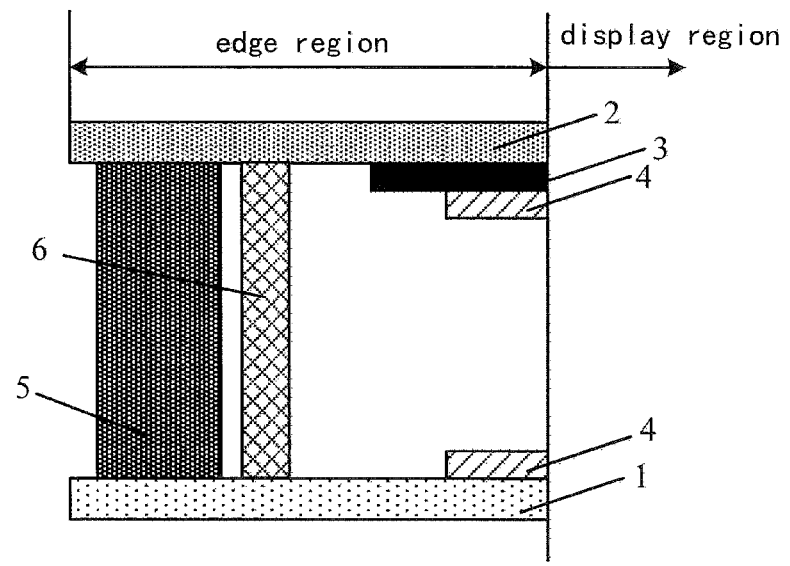
FIG. 6 is a cross sectional view schematically showing sealant of the unitary display screen, as shown in FIG. 4, in which a region coated with a marker sealant is provided.

FIG. 4 is a plan schematic view showing a structure of a unitary display screen according to an embodiment of the present invention. FIG. 5 is a cross sectional schematic view showing peripheral regions of the unitary display screen, as shown in FIG. 3, in which a region coated with a marker sealant is not provided. FIG. 6 is a cross sectional view schematically showing sealant of the unitary display screen, as shown in FIG. 4, in which a region coated with a marker sealant is provided. As illustrated in FIGS. 4-6, according to an embodiment of the present invention, it provides a display apparatus comprising an array substrate 1 and a color filter substrate 2. Certainly, the display apparatus also should comprise respective components such as a liquid crystal layer, a drive circuit and a backlight module. However, considering that the inventive concept of the present invention is only directed to a color filter substrate, an array substrate and a sealant, as described above, only the technical details relative to these components will be explained below. As appreciated by the skilled person in the art, other components may be provided correspondingly as required on the basis of the knowledge in the prior art.

In particular, a black matrix 3 and an alignment film 4 are arranged (e.g., coated) sequentially on an inner surface (e.g., a part of the inner surface) of the color filter substrate 2, and another alignment film 4 is arranged (e.g., coated) on an inner surface (e.g., a part of the inner surface) of the array substrate 1, and the inner surface of the array substrate 1 has an edge which is adhered by sealant to an edge of the inner surface of the color filter substrate 2. In the present disclosure, the adhering position of the sealant is not limited specifically. In an alternative embodiment, the sealant may be sealant having both sealing effect and electrically conducting effect. The sealant needs to be in contact with common electrodes on the inner surfaces of the color filter substrate 2 and the array substrate 1, so as to conduct the common electrode of the array substrate 1 to the common electrode of the color filter substrate 2.

A first marker region for marking unitary display screens in the same batch of exposure is arranged on the inner surface of the array substrate 1 at a source end at the bottom of the display apparatus. In an embodiment of the present invention, the first marker region is formed while a metal layer is patterned on the array substrate 1. Typically, the patterning process means a process, such as thin film sputtering or deposition, photoresist coating, exposing, developing, etching, peeling off.

The sealant 5 is arranged at the peripheral region of the corresponding unitary display screen and is perpendicular to the array substrate 1 and the color filter substrate 2. Typically, a second marker region is provided between the array substrate 1 and the color filter substrate 2. In an embodiment of the present invention, the second marker region is a region 6 coated with a marker sealant, which is arranged between the inside of the sealant of the corresponding unitary display screen and a display region of the corresponding unitary display screen. Preferably, the second marker region and the first marker region are located on the same side of the display apparatus and spaced from each other. In particular, as shown in FIGS. 4 and 6, the second marker region and the first marker region are both located on the bottom side of the display apparatus shown in FIG. 4 (i.e., page of FIG. 4). Certainly, the position of the second marker region is not limited in the present disclosure. It should be noted that the region 6 coated with a marker sealant extends along a direction parallel to the extending direction of the sealant 5 of the unitary display screen, that is, they both extend a distance from left to right, as shown in FIG. 4.

In an arrangement of the second marker region 6, unitary display screens in different batches of exposure is marked by coating of marker sealant 5 in the region 6 coated with a marker sealant, for example, the unitary display screens in different batches of exposure may be distinguished from each other by the coating length of the marker sealant in the region 6 coated with a marker sealant. Alternatively, the second marker region may be divided into a plurality of sub-regions and the batches of exposure of the unitary display screens may be marked by combination of coating different sub-regions.

As illustrated in FIG. 6, the second marker region is the region 6 coated with marker sealant. In an embodiment of the present invention, the region 6 coated with the marker sealant is rectangular. Taking six-time exposure process for the glass array substrate as one example, the rectangle may have a length of 6 mm. The region may be divided equally into six sub-regions by the metal layer on the glass array substrate (considering that the position definition of coating the marker sealant in the region 6 coated with the marker sealant is 0.2 mm, each sub-region will have a length of 1 mm) The times of exposure may be marked by the coated number of the sub-regions.

Figure 7:
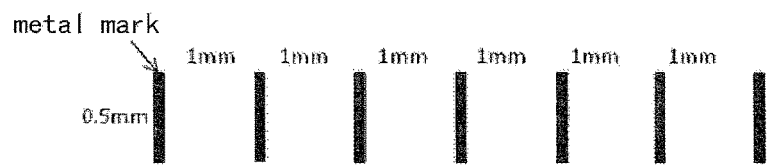
FIG. 7 is a schematic view showing a structure of metal mark in the region coated with the marker sealant.
Figure 8:
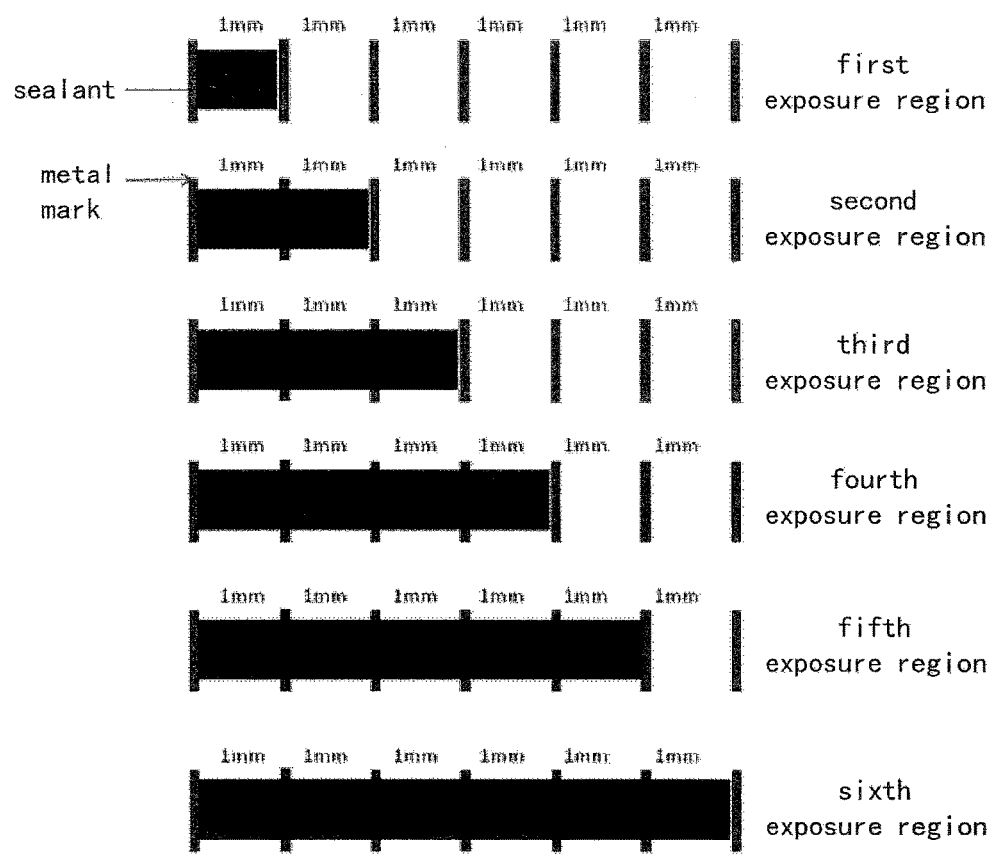
FIG. 8 is a schematic view showing different lengths of coating in the region coated with the marker sealant in FIG. 7 for different exposure regions.

As shown in FIG. 6, the second marker region 6 is located inside of the sealant 5, which achieves the marking mainly by metal marks on the array substrate side and the coating of the marker sealant 6. FIG. 7 is a schematic view showing a structure of metal marks in the region 6 coated with the marker sealant. In FIG. 7, seven adjacent or spaced metal marks are used to form the second marker region 6. Each metal mark has a width of 0.02 mm and a height of 0.5 mm. The adjacent metal marks are uniformly spaced by 1 mm to form six space sections that respectively correspond to six exposure regions on the mother glass. One space section in the region 6 coated with the marker sealant is coated with the sealant within the first exposure region, two space sections in the region 6 coated with the marker sealant are coated with the sealant within the second exposure region, . . . and so on, six space sections in the region 6 coated with the marker sealant are coated with the marker sealant within the sixth exposure region, as shown in FIG. 8. In this way, it achieves that the unitary display screens on the same position of the different exposure regions are distinguished from each other by different lengths of the region coated with the marker sealant (as shown in FIG. 2). The metal mark may be implemented by the metal layer of a signal line (Data layer) or a gate line (Gate layer). Certainly, the arrangement of the metal mark is not limited to this. In fact, it will be usable as long as the width of the metal mark meets the minimum exposure size of the metal, the height of the metal mark may be arranged between 0.1 mm and 1 mm, and the spacing between adjacent metal marks should be greater than the minimum definition of 0.2 mm for coating the sealant in the region coated with the marker sealant.

Figure 9:
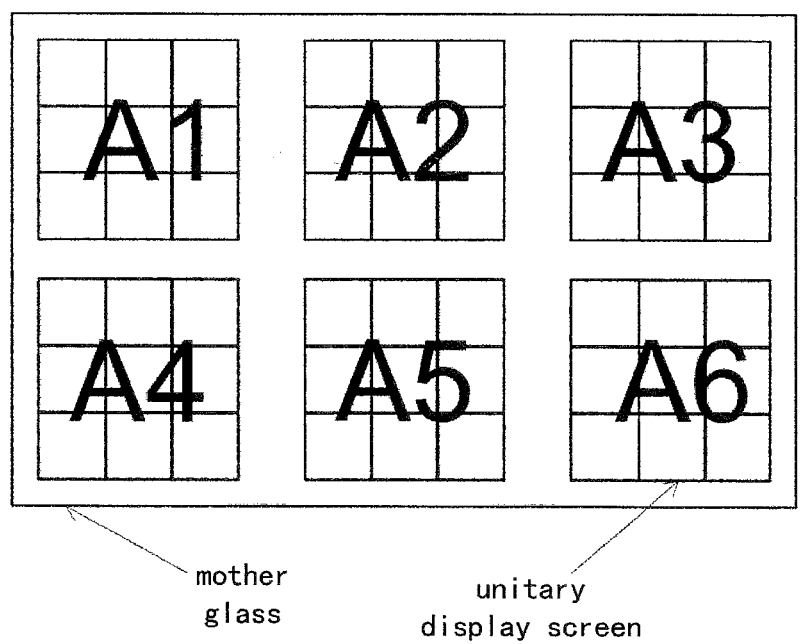
FIG. 9 is a schematic view of display screens in different batches of exposure.

As discussed above, the plurality of unitary display screens in the same batch of exposure may be distinguished from each other by the exposure process, however, the unitary display screens in different batches of exposure cannot be distinguished from each other by this way. In the present disclosure, when the sealant is coating, the sealant is coated at first in first marker region and then the sealant is coated in the second marker region (i.e., coating of the marker sealant) for the unitary display screens within different exposure regions (A1, A2, A3, A4, A5, A6). As shown in FIG. 9, for all of the unitary display screens in the A1 region, the second marker region is coated with one section of sealant; for all of the unitary display screens in the A2 region, the second marker region is coated with two sections of sealant; and so on; for all of the unitary display screens in the A6 region, the second marker region is coated with six sections of sealant. In this way, the unitary display screens in different batches of exposure can be distinguished from each other by the difference in coating patterns of the marker sealant, and finally, marking of Panel ID of all of unitary display screens on the mother glass can be achieved. Certainly, the exposure times in the present disclosure are not limited to six times, may be greater than or less than 6 times.

As discussed above, in the present disclosure, the position of any one unitary display screen on the mother glass may be determined by combining of the first marker region formed by exposure process and the second marker region of each unitary display screen, thereby accurately marking the unitary display screens.

According to another aspect of the present disclosure, it provides a method for producing a marker of a display apparatus, the method comprising the following:

Step 1 of providing a first marker region on an inner surface of the array substrate at a source end at the bottom of the display apparatus, the first marker region being configured to mark unitary display screens in the same batch of exposure.

In an embodiment of the present invention, the first marker region is formed while a metal layer is patterned on the array substrate. Typically, the patterning process means a process, such as thin film sputtering or deposition, photoresist coating, exposing, developing, etching, and peeling off.

Step 2 of providing a second marker region between the array substrate and the color filter substrate, the second marker region being configured to mark unitary display screens in different batches of exposure;

Step 3 of adhering an edge of an inner surface of the array substrate to an edge of an inner surface of the color filter substrate by a sealant, wherein a black matrix and an alignment film are arranged (e.g., coated) sequentially on a part of the inner surface of the color filter substrate, and wherein another alignment film is arranged (e.g., coated) sequentially on a part of the inner surface of the array substrate.

The order of performing the above Step 2 and Step 3 is not limited to this and may be exchangeable. Typically, the coating of the sealant may be performed at first on the normal region and then performed on the region coated with the marker sealant.

In the step of providing the second marker region, the second marker region and the first marker region are provided on the same side of the display apparatus and spaced from each other.

In the step of providing the second marker region, the unitary display screens in the different batches of exposure is marked by coating of the marker sealant in the region coated with the marker sealant.

The second marker region is the region coated with marker sealant. For example, the unitary display screens in different batches of exposure may be distinguished from each other by the length of coating the marker sealant in the region coated with marker sealant. Alternatively, the second marker region is divided into a plurality of sub-regions and the batches of exposure of the unitary display screens may be marked by a combination of coating different sub-regions. The second marker region is divided by a plurality of metal marks spaced on the array substrate side to form the plurality of sub-regions.

At present, the panel manufacturers print codes on the unitary display screen by a laser code printer, that is, form a metal layer on the unitary display screen and print codes on each unitary display screen on the mother glass by laser at a time. The process has the following disadvantages of manual operation, long operation time, adversely limiting capacity of production in production line. In the present disclosure, by combination of the exposure process and the coating process of sealant, marking (i.e., code printing) of the unitary display screens on the mother glass may be achieved. All of processes are mechanical operation, which has low time consumption and less limitation to capacity of production. Further, in comparison with the space occupied by the current Panel ID, the marker region of the present disclosure occupies smaller peripheral regions of the display screen and thus optimizes the design of the periphery of display screen.

The above embodiments are only used to explain object, technical solutions and advantages of the present disclosure. It should be noted that the above embodiments are only examples, instead of being intended to limit the present invention. Any changes, equivalent alternations or modifications that may be made in these embodiments without departing from the spirit and scope of the present invention should fall within the scope of the present invention.

What is claimed is:

1. A method for producing a marker in a display apparatus, comprising the steps of:
    providing a first marker region on an inner surface of the array substrate at a source end located at the bottom of the display apparatus, the first marker region being configured to mark unitary display screens in the same batch of exposure;
    providing a second marker region between the inside of sealant of the corresponding unitary display screen and a display region of the corresponding unitary display screen, the second marker region being configured to mark unitary display screens in different batches of exposure; and
    adhering an edge of an inner surface of the array substrate to an edge of an inner surface of the color filter substrate by the sealant;
    wherein;
    in the step of providing the second marker region, the second marker region is a region coated with a marker sealant and is configured to mark the unitary display screens in the different batches of exposure by coating of the marker sealant in the region coated with the marker sealant;
    in the step of providing the second marker region, the second marker region and the first marker region are provided on the same side of the display apparatus and spaced from each other; and
    the unitary display screens in the different batches of exposure are distinguished from each other depending on the coating lengths of the marker sealant in the region coated with the marker sealant.

2. The method according to claim 1, wherein the unitary display screens in the different batches of exposure are distinguished from each other depending on the coating lengths of the marker sealant in the region coated with the marker sealant.

3. The method according to claim 1, wherein the second marker region is divided into a plurality of sub-regions and the batch of exposure of the unitary display screen is marked by combination of coating different sub-regions, and wherein the second marker region is divided by a plurality of metal marks spaced on the array substrate side to form the plurality of sub-regions.

4. The method according to claim 1, wherein the first marker region is formed while a metal layer is patterned on the array substrate.

* * * * *